July 26, 1938.	G. W. TETER	2,124,836

TIRE TOOL

Filed Dec. 21, 1936

INVENTOR.
GEORGE W. TETER
BY
ATTORNEY.

Patented July 26, 1938

2,124,836

UNITED STATES PATENT OFFICE 2,124,836

TIRE TOOL

George W. Teter, Fairplay, Colo.

Application December 21, 1936, Serial No. 116,980

5 Claims. (Cl. 81—15.4)

This invention relates to tools for use in inserting "inner" tubes in the casings of tires of the pneumatic type, its primary object being to provide a tool capable of holding the valve-stem of the tube from slipping inwardly when the tube is inserted in the casing in a partially deflated condition.

A further object of the invention resides in providing in association with a tool of the above stated character, a simple device for opening the valve inside the stem, for the purpose of inflating the tube while the tube is held in place by means of the tool or under similar conditions for ascertaining the air pressure in the tube through the medium of a pressure-gauge.

Other objects are to be found in details of construction, all of which will fully appear in the course of the following description.

Figure 1:
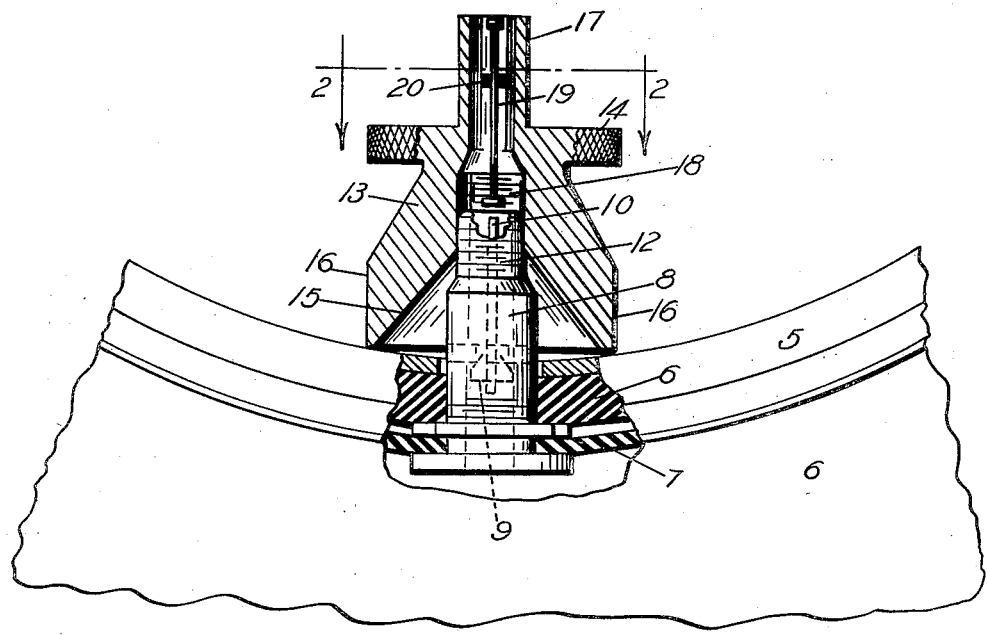
Figure 2:
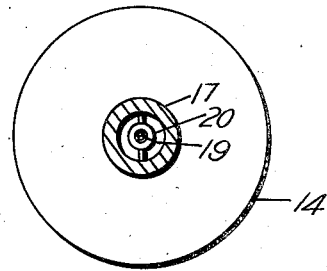

In the accompanying drawing, in the two views of which like parts are correspondingly indicated by numerical reference characters, Figure 1 represents the tool in longitudinal section in its operative position relative to a valve-stem; the inner tube of a tire, to which the valve-stem is fastened, the outer casing of the same, and the rim of a wheel to which the tire is applied having been shown fragmentarily and partially in section; and Figure 2 is a section taken on the line 2—2 of Figure 1.

Referring more specifically to the drawing, the rim of the wheel is shown at 5, the casing of the tire at 6, the inner tube of the same at 7, and the valve-stem projecting outwardly from the tube, at 8.

The valve-stem is of conventional construction, containing the usual valve seat, and a spring-held valve 9 at the end of a rod 10. The stem is exteriorly threaded, as at 12, for the application of the usual cap, not shown in the drawing, and for the application of the tool of the present invention when the cap is removed.

The tool, as shown, comprises a hollow body 13 provided with a milled head 14 to facilitate its manipulation.

The body at one side of the head flares outwardly and the bore of the body is correspondingly flared as at 15, to provide a wide foot 16 for engagement with the rim 5 of the wheel. At the opposite side of the head, the housing is extended into a cylindrical nipple 17 for the application of the chuck of a pump or other source of air under pressure, or a pressure gauge, as the case may be. The bore at the inner end of its flaring portion, is threaded as at 18 to cooperate with the exterior thread 12 of the valve-stem, for the purpose of holding the stem in place through the instrumentality of the tool.

A push-rod 19 headed at both ends, is movable in the bore of the tool through an aperture of a combined guide and stop member 20 extending transversely of the bore.

It is a common occurrence in inserting an inner tube into a tire-casing, that principally owing to the partially deflated condition of the tube, the valve-stem slips into the casing, and the work of subsequently "fishing" the same to place it in its proper position with relation to the openings of the casing and the rim, is often tedious, time-taking and generally annoying to the workman. This is particularly the case when the tube is equipped with a rubber valve-stem of the kind at present in common use.

By the use of a tool according to the present invention, an occurrence of this kind, may be effectively avoided.

The tool is screwed onto the end of the valve-stem as shown in Figure 1, and the stem is drawn outwardly by continued rotation of the tool, which by means of its enlarged foot firmly engages the wheel rim around the opening through which the stem projects.

The tube may thus be inserted in the casing without danger of excessive inward movement of the stem and after the tube is in place in the casing, its valve may be moved away from its seat by means of the push-rod, the inner head of which engages the end of the valve-rod.

The heads at opposite ends of the push-rod are larger than the opening of the guide-member through which the rod extends whereby to prevent of accidental displacement or separation of the rod from the tool when the latter is not in use.

The movement of the push-rod to its valve-opening position may be accomplished by the application of an air-chuck to the nipple of the tool or by the use of a pressure gauge when it is desired to ascertain the air pressure inside the tube, thereby making it possible to inflate the tube or to measure the air pressure within the same, with the tool in its operative position, with the same effect as would have been obtained without the tool.

It is to be understood that the flaring foot 15 not only provides for a firm contact of the tool with the wheel-rim, but also spaces the internal thread of the tool from the point of contact with the rim, thereby making it possible to move and hold the valve-stem in the position which it occupies when the tube of the tire is fully inflated and the tire is in its operative condition with relation to the wheel.

Where the terms "rim-contacting foot" or "rim-engaging foot" are used in the specification, they are intended to designate an end of a body of sufficient superficial extent to effectively contact the rim beyond the opening for the valve stem, thereby preventing any escape of the valve stem through such opening when the tool is in place on the valve stem.

What I claim and desire to secure by Letters Patent is:

1. A tool of the character described, comprising a body having a rim-contacting foot, and having a bore, threaded at a distance from the contact-part of said foot, for the application of a correspondingly threaded valve-stem, and a push-rod movable in said bore, to engage with a valve-part in the stem.

2. A tool of the character described, comprising a body having a rim-contacting foot, and having a bore, threaded at a distance from the contact point of said foot, for the application of a correspondingly threaded valve-stem, the body being provided, opposite to the foot, with a nipple for the application of an air-chuck, pressure gauge or the like, and a push-rod movable in the nipple, to engage with a valve-part in the stem.

3. A tool of the character described, comprising a body having a rim-contacting foot, and having a bore, threaded at a distance from the contact-part of said foot, for the application of a correspondingly threaded valve-stem, a guide-member transverse of the bore, and a push-rod movable in the guide-member, to engage with a valve-part in the stem.

4. A tool of the character described, having a rim-engaging foot, a manipulation-head, and a nipple, the tool having a bore through the nipple terminating in a widened interior of the foot, and the bore having at its juncture with said widened interior, a thread for the connection of a correspondingly threaded valve-stem, and a push-rod movable in the nipple for engagement with a valve-part in the stem.

5. A tool of the character described, having a rim-engaging foot, and a nipple, the tool having a bore through the nipple terminating in a widened interior of the foot, and the bore having at its juncture with said widened interior, a thread for the connection of a correspondingly threaded valve-stem, and a push-rod movable in the nipple for engagement with a valve-part in the stem.

GEORGE W. TETER.